3,165,535
RECOVERY OF KOJIC ACID
James V. Kehoe, Glendale, and Frank Inzerillo, Elmont, N.Y., assignors to Chas. Pfizer & Co., Inc., New York, N.Y., a corporation of Delaware
No Drawing. Filed Feb. 8, 1963, Ser. No. 257,105
7 Claims. (Cl. 260—345.9)

This invention is concerned with kojic acid. More particularly it is concerned with a new and useful process for the recovery of kojic acid from fermentation media.

Kojic acid (2 - hydroxymethyl - 5 - hydroxy - gamma-pyrone) possesses the following structural formula:

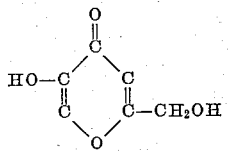

and may be produced readily by microbiological means. Several molds of the genus Aspergillus have the ability to produce kojic acid from suitable carbon-containing nutrient solutions. These include, for example, *A. oryzae*, *A. flavus* var., *A. gymnosardae*, *A. awamori*, *A. candidus*, *A. clavatus*, *A. fumigatus*, *A. giganteus*, *A. albus*, *A. effusus*, *A. nidulans* and others. From among the bacteria, several species of Acetobacter may also form kojic acid under favorable conditions.

Suitable carbon-containing substances fermented to produce kojic acid include starches; dextrins, disaccharides, such as sucrose and maltose; hexoses, such as glucose, fructose, mannose and galactose; pentoses such as xylose and arabinose; and sorbitol, dulcitol, inositol, glycerol, glycero-beta-phosphate dihydroxyacetone, gluconic acid, tartaric acid, and other substances. Particularly good yields have been obtained from glucose and xylose.

In the production of kojic acid by the action of a suitable organism on an essentially carbohydrate substrate, a temperature range of about 29° to 35° C. is optimum for the fermentation. The fermentation generally requires from about 9 to 20 days for completion, the period depending on such factors as type of substrate, species of mold, temperature and pH. The optimum pH for the production of kojic acid under a given set of conditions can readily be determined experimentally by one skilled in the art. A pH range of about 2 to 5 has been found to be satisfactory.

A common practice of obtaining kojic acid from the fermentation medium is the so-called "boil down" technique. After the fermentation is complete, the mycelia are removed from the harvested broth, usually by filtration. The broth is thereafter concentrated and subjected to decolorization and sequestration to improve appearance and purity. The kojic acid is recovered from the concentrated broth by crystallization.

This process of recovering kojic acid has several disadvantages. If the carbon-containing substrate is a pure sugar, such as, for example, refined sugar, recovery yields as high as 80% are possible. The use of a purified sugar substrate, however, is not justifiable from an economic point of view. On the other hand, molasses substrates of varied purity are customarily used in the fermentation, since these are a cheaper source of carbohydrate substrate. The kojic acid-containing fermentation broth often contains such impurities as sugars, organic salts, inorganic salts, by-product acids, etc. As a consequence, the ability to recover kojic acid by the "boil down" technique is seriously impaired. The kojic acid thus recovered will not meet reasonable requirements of purity. The recovery yield is, of course, much lower. Some sources of relatively high purity molasses may allow recovery yields up to about 70%. To obtain reasonably pure kojic acid from the fermentation of molasses sustrates, recourse must generally be made to yield-consuming and time-consuming recrystallizations.

It is an object of this invention to provide a new and novel method of recovering kojic acid from fermentation media.

It is a further object to provide a process for the recovery of kojic acid in relatively high yields.

The objects of this invention are accomplished by the substantially stoichiometric or slight excess addition of metal salts to crude fermentation broths, followed by the metathesis of the resulting salts with acids such as sulfuric or oxalic.

Kojic acid readily forms stable, water-insoluble metal chelates. The most probable structure for the kojic acid chelate with the metal appears to be:

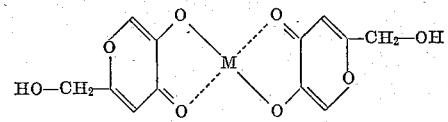

wherein M designates the metal. Such water-insoluble salts may be easily precipitated and isolated. Insoluble salts of kojic acid containing barium, calcium, copper, zinc, tin, manganese and others have been prepared.

It has now been found that kojic acid may be recovered in substantially high yields from fermentation broths by contacting the fermentation broth with a suitable metallic salt, such as zinc sulfate, for example, precipitating the insoluble salt of kojic acid, separating the insoluble salt of kojic acid by filtration; thereafter contacting the metallic kojate with substantially stoichiometric or slight excess amounts of an acid such as oxalic acid, for example, and removing the metallic oxalate by filtration. The kojic acid is obtained from the filtrate by cooling, concentration or other means known in the art. If desired, soluble salts of kojic acid, such as sodium kojate, may be prepared at this point without isolating the free acid. Yields of kojic acid obtained by this process will vary somewhat depending upon the type subtrate used and the choice of metallic salt. With a suitable zinc salt, such as zinc sulfate, for example, and crude molasses as the carbohydrate substrate, yields of about 75 to 90% are obtained.

In the process described hereinbefore, it is noteworthy that after the fermentation reaction for the production of kojic acid has been completed, the fermentation broth may or may not be filtered prior to the addition of the metallic salt. It is preferred, however, that the broth be filtered. Also, it is preferred that the broth be adjusted to a pH of about 10 to 11 prior to the addition of the metallic salt. However, this adjustment is not critical. After the metallic salt has been contacted with the fermentation broth, the optimal pH of the broth should be from about 5.0 to 9.0 and preferably from about 6.8 to 7.2. The metallic kojate which precipitates from solution may be separated from the mother liquor by means well known in the art, such as by filtration or centrifugation. Metathesis may be accomplished by the addition to the metal kojate of acids, such as oxalic acid, sulfuric acid, phosphoric acid, hydrochloric acid, nitric acid and the like. It is preferred that substantially stoichiometric amounts of acid be used. It is to be understood that when metathesis is accomplished by acidification with an acid which forms an insoluble salt with the metal ion of the metallic kojate, the acid salt is precipitated and is removed leaving kojic acid in solution. The kojic acid may then be recovered by means set forth hereinbefore. When metathesis is accomplished by acidification with an acid which forms a soluble salt with the metal ion of the metallic kojate, the kojic acid is crystallized out of the solution and the soluble metal salt is rejected in the mother liquor.

Salts which have been found to be satisfactory for precipitating kojic acid from the fermentation broth include, for example, the chloride or sulfate in particular, of such metals as magnesium, calcium, strontium and barium of Group IIA of the periodic table; divalent salts of metals such as zinc, copper, manganese, iron and lead; and trivalent salts of metals such as aluminum and bismuth. Particularly effective are the divalent salts selected from the group consisting of zinc, copper, manganese, iron and lead. The metallic salts need not be limited to the chloride or sulfate, but other salts are also effective, such as, for example, the nitrate, acetate, phosphate and the like.

In the examples set forth hereinafter, the fermentation broths were obtained by cultivating *Aspergillus flavus* (NRRL 484), in a fermentation medium containing crude molasses as the carbon-containing substrate. The kojic acid content of the various fermentation broths was determined by measuring the adsorption of the ferric complex of kojic acid. This may be accomplished as follows: One gram of sample is placed in a 1 liter volumetric flask and diluted to volume with water. A 25 ml. aliquot is taken and diluted to 100 ml. with water. A 10 ml. aliquot of this is taken and to it are added 40 ml. of water and 5 ml. of freshly prepared 0.5% ferric chloride solution (aqueous). After waiting 5 minutes for color to develop, the solution is placed in a Beckman Du Spectrophotometer and read at 498 m$\mu$ against a blank.

per cent kojic acid=

$$\frac{\text{optical density} \times 2000}{\text{Slope of Standard Curve} \times \text{wt. of Sample}}$$

It is to be understood that the process of the instant invention may be applied to the fermentation broth obtained by any fermentative method for the production of kojic acid.

The following examples are set forth to further describe the novelty of the instant invention, it being understood that numerous changes and modifications can be made by one skilled in the art without departing from the spirit and scope thereof.

*Example I*

Eight thousand gallons of fermentation broth, containing 0.5 lb. of kojic acid per gallon are adjusted to a pH of 10.0 with caustic while maintaining the temperature below 50° C. A zinc sulfate solution (2520 lbs. zinc sulfate monohydrate in 500 gallons of water) is added with stirring. The pH is adjusted to 6.8, and the mixture stirred for an additional 2 hours. The zinc kojate which precipitates out is filtered and placed in a tank with 200 gallons of water. A solution of 2120 lbs. of oxalic acid dihydrate in 1800 gallons of water is added to the tank containing the zinc kojate, and the whole is heated at 65° C. for 1 hour. The mixture is filtered and the precipitate, which is zinc oxalate, is washed with water at 65° C. to a total volume of 2350 gallons in the filtrate.

The filtrate, containing approximately 3500 lbs. of kojic acid in solution, is adjusted to a pH of 9.5 by the addition of 1 N sodium hydroxide solution while maintaining the temperature at 38°–40° C. The slurry which forms is then cooled to room temperature and allowed to crystallize further for 2 hours. The mixture is centrifuged, and the precipitate is washed with cold water. The mother liquor obtained from the centrifugation is adjusted to a pH of 9.5 with caustic and concentrated in a vacuum pan at 42° C. to about 1100 gallons. After concentration, the mother liquor is cooled to room temperature, crystallized and centrifuged to remove the precipitate. The precipitates are combined to yield the sodium salt of kojic acid in 75% yield.

*Example II*

Following the procedure of Example I, the filtrate, containing approximately 3500 lbs. of kojic acid, is concentrated to near dryness. The precipitate which crystallizes out is filtered and dried to yield kojic acid in about 78% yield.

*Example III*

The procedure of Example I is followed except that instead of using a zinc sulfate solution, a ferrous sulfate solution (3920 lbs. ferrous sulfate heptahydrate in 1600 gallons of water) is used. Kojic acid is recovered as the sodium salt in about 80% yield.

*Example IV*

Following the procedure of Example I, the zinc kojate which precipitates out is filtered and placed in a tank with enough water to make a slurry. The salt is decomposed by adding sulfuric acid until a pH of 1 is reached. Kojic acid precipitates out and is filtered. Zinc is removed in the mother liquors as the soluble sulfate. The kojic acid is obtained in about 80% yield.

*Example V*

Four thousand gallons of fermentation broth, containing 0.4 lb. of kojic acid per gallon, are adjusted to a pH of 10.5 with caustic while maintaining the temperature below about 50° C. A zinc sulfate solution (1125 lbs. zinc sulfate monohydrate in 300 gallons of water) is added with stirring. The pH is adjusted to 7.2 and the mixture stirred for an additional 2 hours. The zinc kojate which precipitates out is filtered and placed in a tank with 100 gallons of water. A solution of 840 lbs. of oxalic acid dihydrate in 715 gallons of water is added to the tank containing the zinc kojate, and the whole is heated at 65° C. for 1 hour while maintaining the pH at about 2. The mixture is filtered, and the precipitate, zinc oxalate, is washed with water at 65° C. to a total volume of about 800 gallons in the filtrate.

The filtrate, containing approximately 1500 lbs. of kojic acid in solution, is concentrated to near dryness. The precipitate which crystallizes out is filtered and dried to yield kojic acid in about 90% yield.

*Example VI*

The procedure of Example I is repeated substituting for zinc sulfate monohydrate, stoichiometrically-equivalent amounts of the following salts:

| | | |
|---|---|---|
| $CuSO_4 \cdot 5H_2O$ | $CaCl_2$ | $AlCl_3$ |
| $MnSO_4 \cdot 4H_2O$ | $MgCl_2 \cdot 6H_2O$ | $BiCl_3$ |
| $PbSO_4$ | $BaCl_2 \cdot 2H_2O$ | |

In each case, kojic acid is obtained as the sodium salt.

*Example VII*

The procedure of Example I is repeated using a stoichiometrically-equivalent amount of phosphoric acid instead of oxalic acid. The zinc is removed as the insoluble zinc phosphate. Kojic acid is recovered as the sodium salt.

*Example VIII*

Following the procedure of Example I, the zinc kojate which precipitates out is filtered and placed in a tank with enough water to make a slurry. The salt is decomposed by adding hydrochloric acid until a pH of 1 is reached. Kojic acid precipitates out and is filtered. Zinc is removed in the mother liquors as the soluble chloride.

*Example IX*

Following the procedure of Example I, the zinc kojate which precipitates out is filtered and placed in a tank with enough water to make a slurry. The salt is decomposed by adding nitric acid until a pH of 1 is reached.

Kojic acid precipitates out and is filtered. Zinc is removed in the mother liquors as the soluble nitrate.

What is claimed is:

1. A process for the recovery of kojic acid and the water soluble salts thereof from a kojic acid-containing fermentation broth which comprises the steps of contacting the said broth with substantially stoichiometric amounts of a salt of a metal selected from the group consisting of Group IIA of the Periodic Chart of the Elements, divalent zinc, copper, manganese, iron and lead, trivalent aluminum and bismuth; adjusting the said broth to a pH of from about 5 to about 9; precipitating and separating the insoluble metal salt of kojic acid; thereafter contacting said metal salt of kojic acid with substantially stoichiometric amounts of an acid selected from the group consisting of oxalic acid, sulfuric acid, phosphoric acid, hydrochloric acid and nitric acid; and thereafter separating the kojic acid.

2. A process for the recovery of kojic acid and the water soluble salts thereof from a kojic acid-containing fermentation broth which comprises the steps of contacting the said broth with substantially stoichiometric amounts of a divalent salt of a metal selected from the group consisting of zinc, copper, manganese, iron and lead; adjusting the said broth to a pH of from about 5 to about 9; precipitating and separating the insoluble metal salt of kojic acid; thereafter contacting said metal salt of kojic acid with substantially stoichiometric amounts of an acid selected from the group consisting of oxalic acid, sulfuric acid, phosphoric acid, hydrochloric acid and nitric acid; and thereafter separating the kojic acid.

3. The process of claim 1 wherein the acid is oxalic acid and separation of kojic acid is effected by removal of the precipitated oxalate and recovery of the kojic acid from the filtrate.

4. The process of claim 1 wherein the acid is sulfuric acid and separation of kojic acid is effected by crystallizing the kojic acid from the solution.

5. The process as set forth in claim 1 wherein the metal salt is zinc sulfate and the acid is oxalic acid.

6. The process as set forth in claim 1 wherein the metal salt is zinc sulfate and the acid is sulfuric acid.

7. The process as set forth in claim 1 wherein the metal salt is ferrous sulfate and the acid is oxalic acid.

References Cited by the Examiner
UNITED STATES PATENTS

| | | | |
|---|---|---|---|
| 2,395,866 | 3/46 | Gutzeit | 260—345.9 |
| 2,460,188 | 1/49 | O'Kane et al. | 260—345.9 |
| 3,093,659 | 6/63 | Bell et al. | 260—345.9 |

OTHER REFERENCES

Barham et al.: Trans. Kansas Academy Science, vol. 37, pp. 91–113 (1934).

Chemical Abstracts, vol. 17, pp. 1475–1476 (1923), abstracting Yabuta, Journal Chemical Society Japan, vol. 37, pp. 1185–1233, 1234–1269 (1916).

Wiley et al.: Journal American Chemical Society, vol. 64, pp. 963–964 (1942).

IRVING MARCUS, *Primary Examiner.*

NICHOLAS S. RIZZO, *Examiner.*